Patented Dec. 1, 1936

2,062,402

UNITED STATES PATENT OFFICE 2,062,402

PROCESS OF MAKING PRODUCTS COMPRISING DERIVATIVES OF CELLULOSE

Camille Dreyfus, New York, N. Y., and George Schneider, Montclair, N. J., assignors to Celanese Corporation of America, a corporation of Delaware No Drawing. Application December 3, 1931, Serial No. 578,738

6 Claims. (Cl. 18—57)

This invention relates to the preparation of materials comprising derivatives of cellulose, and relates more particularly to the preparation of films, foils or other sheet-like material containing organic derivatives of cellulose and having improved properties.

An object of our invention is to prepare sheet-like products comprising organic derivatives of cellulose having superior strength and/or greater impermeability to moisture. Other objects of our invention will appear from the following detailed description.

Thin foils made of cellulose acetate or other water-insoluble organic derivatives of cellulose have many desirable properties which render them eminently suitable for use as transparent wrappings for various articles. However foils of cellulose acetate as ordinarily made are not as impermeable to moisture as is often desired.

We have concluded that this permeability to moisture is due to the presence of substantially free or undiluted water or other nonsolvent in the foils or films after the evaporation of the bulk of the volatile solvent present in the solution or dope from which they are formed, so that during the later stages of the formation of the foils the medium present is a nonsolvent for the cellulose acetate and thus causes precipitation or incipient precipitation. This conclusion is based on our discovery that if foils or films are cast from solutions which are made from both organic derivatives of cellulose and solvents which are substantially free from moisture, the resultant product is considerably more impermeable to moisture. Moreover, we have found that if a relatively nonvolatile substance that has at least a latent solvent action on the organic derivative of cellulose, and which is at least slightly soluble in water, is incorporated in such films or foils so that any water present forms with the nonvolatile substance a solution that has at least a latent solvent action on the organic derivative of cellulose, increased impermeability to moisture is obtained, even when such films or foils are prepared from solutions or dopes containing the ordinary amount of water. Moreover we have found that foils or films made by these methods have other superior properties, such as increased strength, greater pliability, as shown by the number of times they may be folded without breaking, and in other respects.

In accordance with our invention we prepare sheet-like materials by casting or flowing a solution of a derivative of cellulose in a suitable volatile solvent upon a surface and permitting the same to dry, while observing either or both of the conditions that the solution is substantially free of water or contains a relatively nonvolatile substance that is at least partially miscible with or soluble in water and which is a solvent for the derivative of cellulose or at least has a latent solvent power for the same.

The sheet-like material made in accordance with this invention may be thin foils having a thickness of the order of 0.001" to be used for wrapping articles or any other suitable purposes, or it may be films having a thickness of 0.003" or more to be used for various purposes, such as photographic film base. These sheet-like materials may be made by casting or flowing a solution of the derivative of cellulose made in accordance with this invention onto smooth metallic or glass surfaces, such as of film wheels, bands, tables, etc. as is well known in the art.

While we prefer to employ cellulose acetate for making the sheet-like material, other esters or derivatives of cellulose, particularly organic derivatives of cellulose such as organic esters of cellulose or cellulose ethers may be employed. Examples of organic esters of cellulose are cellulose formate, cellulose propionate and cellulose butyrate while examples of cellulose ethers are ethyl cellulose, methyl cellulose and benzyl cellulose.

The solution or dope to be used for casting the film comprises the cellulose acetate or other derivative of cellulose dissolved in a volatile solvent, such as acetone, and may contain other ingredients such as plasticizers, dyes or effect materials, if desired. After the solution is cast on the surface the volatile solvent is caused to evaporate to leave the film or foil.

In making the solution or dope that is to be free of water, the ordinary organic derivative of cellulose which contains from 3 to 10% of water is thoroughly dried, under vacuum if required, until it contains substantially no water or no more than 1% of its weight of water, and the volatile solvent employed is substantially anhydrous. If acetone is employed as the solvent, it is desirable that it be substantially anhydrous or contains at most 0.5% of water.

As stated, we have found that if a plasticizer for the organic derivative of cellulose that is a relatively nonvolatile substance, that is a solvent or a latent solvent for the organic derivative of cellulose, and which is at least partially soluble or miscible with water, is incorporated in the solution containing the usual amount of water, the films or foils cast therefrom have properties that are superior to those heretofore made. Examples of such substances for use in connection with cellulose acetate are diacetin, monacetin, dimethyl tartrate and diethyl tartrate. The amount of these materials used may be from 1 to 10% or more of the weight of the organic derivative of cellulose present. Still greater improvement of the properties of the resulting sheet-like material is obtained when these substances are incorporated in solutions or dopes that are substantially anhydrous.

Foils made by this invention are eminently suitable for use in the wrapping of tobacco products, foodstuffs and like materials where impermeability to moisture is desired but they may be used for other purposes such as the wrapping of other articles, as windows in envelopes and for all other purposes for which transparent foil is suited.

In order further to illustrate our invention, but without being limited thereto, the following examples are given.

*Example I*

The following is an example of carrying out our invention where a substantially anhydrous solution is employed for making the thin foils.

A solution or dope is made up as follows:

| | Parts by weight |
|---|---|
| Anhydrous cellulose acetate | 100 |
| Anhydrous acetone | 400 |
| Diethyl phthalate | 20 |
| Triphenyl phosphate | 10 |

This solution is cast upon the polished periphery of a wheel to form a layer which produces, upon drying, a foil having a thickness of about 0.001" and the foil thus formed is dried.

Foil can be made in this manner which is substantially 100% more impermeable to moisture, is substantially 25% stronger and can be folded about 50% more times without breaking, than foils made in accordance with the above formula but where ordinary cellulose acetate containing about 5% of water and ordinary acetone containing about 5% of water are employed.

*Example II*

The following example illustrates the effect of adding a water soluble plasticizer, in this case diacetin, to the cellulose acetate solution.

A solution or dope is made up as follows:

| | Parts by weight |
|---|---|
| Ordinary cellulose acetate (containing about 5% water) | 100 |
| Ordinary acetone | 400 |
| Diethyl phthalate | 16.7 |
| Diacetin | 5 |
| Triphenyl phosphate | 8.3 |

Foils are made from this solution in the manner described in Example I. The foils so made have been found to be substantially 85% more impermeable to moisture, substantially 33% stronger, have substantially 35% greater elongation and can be folded more times without breaking, than foils made from a similar solution of cellulose acetate but not containing the diacetin.

*Example III*

The procedure of Example II is carried out with the exception that anhydrous cellulose acetate and anhydrous acetone are employed. The foils so made are superior to those made in Examples I and II with respect to strength and are vastly superior to foils made in the ordinary manner with respect to impermeability to moisture, pliability and in other respects.

The foregoing detailed description is given merely by way of illustration and many variations may be made therein without departing from the spirit of our invention.

Having described our invention, what we desire to secure by Letters Patent is:

1. Process for the production of organic derivative of cellulose films having improved properties which comprises casting such films from a solution of a substantially anhydrous organic derivative of cellulose in a substantially anhydrous volatile solvent, which solution contains a water-miscible, relatively non-volatile solvent in a proportion up to 10%, based on the weight of the organic derivative of cellulose, to prevent formation of a precipitating medium at any stage of the film forming process.

2. Process for the production of cellulose acetate films having improved properties which comprises casting such films from a solution of a substantially anhydrous cellulose acetate in a substantially anhydrous volatile solvent, which solution contains a water-miscible, relatively non-volatile solvent in proportion up to 10%, based on the weight of the cellulose acetate, to prevent formation of a precipitating medium at any stage of the film forming process.

3. Process for the production of organic derivative of cellulose films having improved properties which comprises casting such films from a solution of substantially anhydrous organic derivative of cellulose in a substantially anhydrous volatile solvent, which solution contains diacetin in proportion up to 10%, based on the weight of the organic derivative of cellulose, to prevent formation of a precipitating medium at any stage of the film forming process.

4. Process for the production of cellulose acetate films having improved properties which comprises casting such films from a solution of substantially anhydrous cellulose acetate in a substantially anhydrous volatile solvent, which solution contains diacetin in proportion up to 10%, based on the weight of the cellulose acetate, to prevent formation of a precipitating medium at any stage of the film forming process.

5. Process for the production of organic derivative of cellulose films having improved properties which comprises casting such films from a solution of substantially anhydrous organic derivative of cellulose in a substantially anhydrous volatile solvent, which solution contains a proportion of the order of 5%, based on the weight of the organic derivative of cellulose, of diacetin.

6. Process for the production of organic derivative of cellulose films having improved properties which comprises casting such films from a solution of substantially anhydrous cellulose acetate in a substantially anhydrous volatile solvent, which solution contains a proportion of the order of 5%, based on the weight of the cellulose acetate, of diacetin.

CAMILLE DREYFUS.
GEORGE SCHNEIDER.